United States Patent
Cross et al.

(10) Patent No.: US 11,814,530 B2
(45) Date of Patent: Nov. 14, 2023

(54) STRETCHABLE ELECTRICALLY CONDUCTIVE INK COMPOSITIONS

(71) Applicant: HENKEL IP & HOLDING GMBH, Duesseldorf (DE)

(72) Inventors: Robert P. Cross, Rocky Hill, CT (US); Wenhua Zhang, Farmington, CT (US); Zhan Yang, Rocky Hill, CT (US); Jiangbo Ouyang, Wallingford, CT (US); Yu Chen, Glastonbury, CT (US); Lynnette M. Hurlburt, Manchester, CT (US); Darel L. Gustafson, Shelton, CT (US)

(73) Assignee: HENKEL AG & CO, KGaA, Duesseldorf (DE)

( * ) Notice: Subject to any disclaimer, the term of this patent is extended or adjusted under 35 U.S.C. 154(b) by 161 days.

(21) Appl. No.: 17/370,053

(22) Filed: Jul. 8, 2021

(65) Prior Publication Data

US 2021/0340398 A1 Nov. 4, 2021

Related U.S. Application Data

(63) Continuation of application No. PCT/US2019/067092, filed on Dec. 18, 2019.

(60) Provisional application No. 62/794,181, filed on Jan. 18, 2019.

(51) Int. Cl.
| | |
|---|---|
| *C09D 11/52* | (2014.01) |
| *C09D 11/033* | (2014.01) |
| *C09D 11/037* | (2014.01) |
| *C09D 11/102* | (2014.01) |

(52) U.S. Cl.
CPC ............ *C09D 11/52* (2013.01); *C09D 11/033* (2013.01); *C09D 11/037* (2013.01); *C09D 11/102* (2013.01)

(58) Field of Classification Search
CPC ...................................................... C09D 11/52
See application file for complete search history.

(56) References Cited

U.S. PATENT DOCUMENTS

| 4,888,135 A | 12/1989 | Tsunaga et al. | |
|---|---|---|---|
| 2003/0151028 A1* | 8/2003 | Lawrence | H05K 1/095 252/500 |
| 2008/0266661 A1* | 10/2008 | Nakamura | G02F 1/133528 349/96 |
| 2009/0173919 A1 | 7/2009 | Webster et al. | |

(Continued)

FOREIGN PATENT DOCUMENTS

| CN | 1942411 A | 4/2007 |
|---|---|---|
| CN | 106147385 A | 11/2016 |

(Continued)

OTHER PUBLICATIONS

Online Database of Chemicals—Plenact KR-55 https://www.chemblink.com/products/64157-14-8.htm.*

(Continued)

*Primary Examiner* — Khanh T Nguyen
(74) *Attorney, Agent, or Firm* — Sun Hee Lehmann

(57) ABSTRACT

Disclosed herein are stretchable conductive ink compositions comprising a polymer, conductive flake, an additive, and optionally conductive beads, wherein the initial resistivity is measured before elongation, and wherein the resistivity at 50% elongation is about 10 times or less of the initial resistivity.

18 Claims, 2 Drawing Sheets

(56) References Cited

U.S. PATENT DOCUMENTS

2016/0060165 A1  3/2016  Moireau et al.
2016/0130471 A1  5/2016  Burrows et al.

FOREIGN PATENT DOCUMENTS

| CN | 107001686 A | 8/2017 |
|---|---|---|
| EP | 3104370 A1 | 12/2016 |
| WO | 2005077854 A1 | 8/2005 |
| WO | 2016073465 A1 | 5/2016 |
| WO | 2018134411 A1 | 7/2018 |

OTHER PUBLICATIONS

Research on the electrical conductivity of conductive flake nano-silver mixed with cubic nano-silver crystal, edited by Jian Yang et al., Printed Electronics, No. 10, pp. 57-60, which was deemed to be disclosed on Dec. 31, 2011.
Material Physics Experiment Instruction, edited by Wen Lei et al., p. 150, Southeast University Press, Feb. 2018.
Modern Cosmetics Science and Technology, edited by Bingyi Qiu et al., p. 1087, China Light Industry Press, March in 2016.

\* cited by examiner

STRETCHABLE ELECTRICALLY CONDUCTIVE INK COMPOSITIONS

BACKGROUND OF THE INVENTION

New commercial applications requiring printed conductive materials are continuously arising in the electronics industry. Some of these commercial applications are printed antennas for radio frequency identification ("RFID") tags, printed transistors, solar cells, in-mold electronics and wearable electronics. These printed conductive materials are typically produced by printing a conductive ink using a specific printing process.

Conductive inks are typically particle-based, based on conductive particles, which are typically synthesized separately and then incorporated into the ink formulation. The properties of the resulting conductive ink are then tuned for a specific printing process and end use. Typically, the printing processes require a specific viscosity to allow for printing of the composition. A conductive ink can selectively be applied to desired substrates by one of these specific printing processes.

Stretchable conductive inks, specifically, are in demand in two major areas: 1) in-mold applications, which includes panels for appliances, dashboards and buttons for automotive and aerospace applications, and interfaces for industry controls and 2) wearable applications, which include but are not limited to textile applications and wearable medical devices. The usefulness of existing conductive inks for in-mold and wearable applications is limited because the conductivity of the inks is lost at relatively low elongation i.e., the inks are not stretchable.

Commercially available conductive particles include silver flakes that are commonly surface modified with stearic or oleic acid to enable milling and keep from cold welding during storage. This surface treatment, however, does not improve stretch or conductivity of the composition and is useful only for dispersing the powder in the matrix.

A typical conductive ink is a highly filled composite when cured or dried, which may contain more than 50% of inorganic conductive filler. Even when a high elongation polymer matrix is used this highly filled composite can still have much lower elongation compared with a polymer without filler. Therefore, the stretchability of conductive ink compositions decreases with an increase in filler loading as the filler particles will become closer together and elongation is constrained by the rigidity of the conductive fillers and the strong adhesion between the filler particles and polymer binder.

Further, the conductivity of the conductive ink compositions depends on contact between the conductive fillers to form continuous conductive paths. Maintaining these continuous paths while stretching the conductive ink compositions is challenging.

Accordingly, there remains a need for stretchable conductive inks that maintain conductivity after stretch and have higher elongation to electrical and mechanical failure.

SUMMARY OF THE INVENTION

Provided herein are stretchable conductive ink compositions comprising a polymer, conductive flake, and an additive. The initial resistivity of the stretchable conductive ink composition is measured before elongation, and the resistivity at 50% elongation is about 10 times or less of the initial resistivity.

In an alternative embodiment, a stretchable conductive ink composition is provided that includes a polymer, conductive flake, conductive bead, and an additive. The initial resistivity of the stretchable conductive ink composition is measured before elongation, and the resistivity at 50% elongation is no more than about 10 times the initial resistivity.

DETAILED DESCRIPTION OF THE INVENTION

Figure 1:
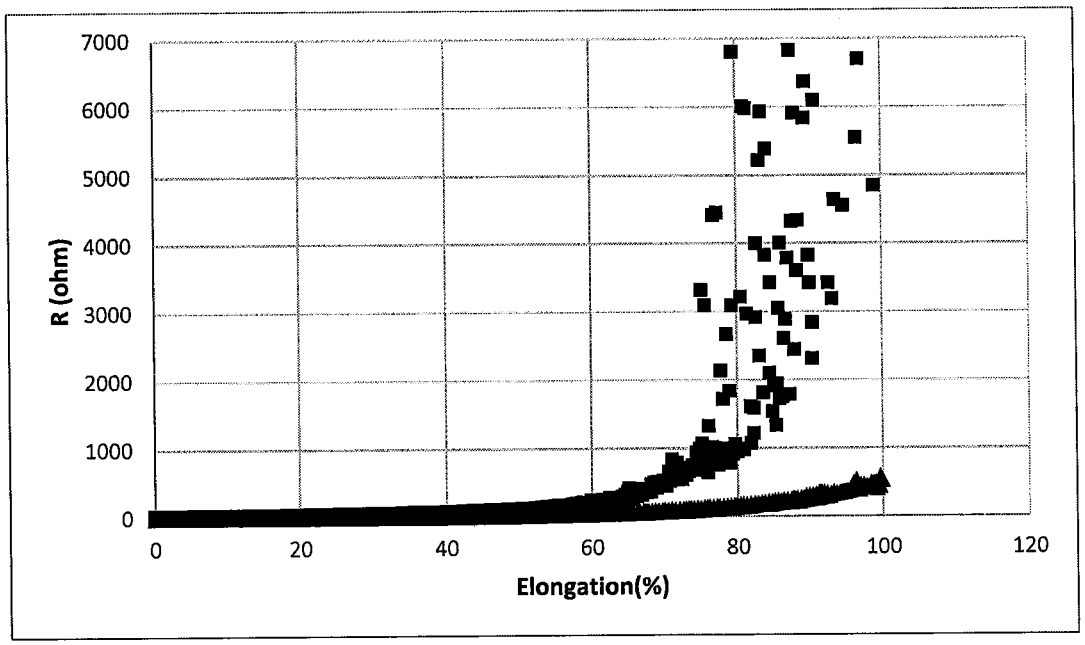
FIG. 1 depicts a plot of resistance (Ohm) versus elongation percentage for a control composition as compared to a control composition with 1 vol. % fluorosilane added.

Provided herein are stretchable conductive ink compositions that include an additive and optionally conductive beads to enhance the stretchability of the ink composition. Specifically, the additive and optional beads in the ink compositions disclosed herein allows the ink to maintain its conductivity when the ink is stretched.

It was surprisingly discovered that the interaction between the conductive particles and the polymer matrix of the ink composition is a limiting factor in the conductivity of the ink compositions when stretched. Accordingly, the additives included in the ink compositions disclosed herein reduce the interaction between the conductive particles and the polymer matrix of the ink giving the composition better elongation at break. Further, the optional conductive beads allow the conductive flakes to move relative to each other while maintaining the conductive pathway.

Specifically, disclosed herein are stretchable conductive ink compositions comprising a polymer, conductive flake, and an additive, wherein initial resistivity is measured before elongation, and wherein the resistivity at 50% elongation is about 10 times or less of the initial resistivity.

In an alternative embodiment stretchable conductive ink compositions are disclosed that comprise a polymer, conductive flake, conductive beads, and an additive, wherein initial resistivity is measured before elongation, and wherein the resistivity at 50% elongation is no more than about 10 times the initial resistivity.

Conductive Flakes

The conductive flakes used herein can be chosen from a variety of conductive flakes known in the art. The conductive flake can be thermally conductive, electrically conductive, thermally insulating, electrically insulating, or various combinations thereof. In a preferred embodiment, the conductive flake is electrically conductive.

Exemplary conductive fillers include, but are not limited to, silver, copper, gold, palladium, platinum, nickel, gold or silver-coated nickel, carbon black, carbon fiber, graphite, aluminum, indium tin oxide, silver coated copper, silver coated aluminum, metallic coated glass spheres, metallic coated filler, metallic coated polymers, silver coated fiber, silver coated spheres, antimony doped tin oxide, conductive nanospheres, nano silver, nano aluminum, nano copper, nano nickel, carbon nanotubes and mixtures thereof. The conductive flake can be made of a metal or carbon. Preferably, the conductive flake is a silver, aluminum, carbon, nickel, copper, graphite flake, or a combination thereof. More preferably, the conductive flake is a silver flake. In one embodiment the conductive flake is a mixture of different size silver flakes, such as a mixture of SF-80, commercially available from Ferro, and SF-AA0101, commercially available from Metalor.

The conductive flake can be in the geometric form of flake, dendritic, or needle type filler flakes. Specifically, the conductive flakes can have an aspect ratio outside the range of about 0.9 to 1.1, preferably greater than about 1.1.

The conductive flakes will make the ink have a higher viscosity when cured composition harder and therefore less stretchable. An increased conductive flake loading, however, will also increase the conductivity of the composition. Accordingly, it is necessary to balance these two factors when determining the appropriate amount of conductive flake to include in the composition. Preferably, the conductive flake is present in the composition in an amount of about 20% to about 90% by volume, for example about 30% to about 70% by volume, for example about 40% to about 60% by volume of the entire composition.

Additive

The additive included in the conductive ink compositions disclosed herein will reduce the flake-to-polymer interaction while maintaining the flake-flake contact, therefore the additive allows the conductivity of the composition to be maintained when the ink composition is stretched, i.e. the additive will increase the stretchability of the ink composition. However, the additive will typically increase the initial resistivity of the conductive ink composition. Preferably, the additive selected to be included in the conductive ink composition will not significantly increase the initial resistivity of the conductive ink composition.

Specifically, the additive can be a plasticizer, coupling agent, a surfactant, or a combination thereof.

Plasticizers are useful in the conductive ink compositions disclosed herein because they are evenly dispersed in the polymer, reduce interaction with the conductive flake and typically have big impact on conductivity. Preferably, the plasticizer can be selected from Pluracol V10 from BASF Chemicals, shown below,

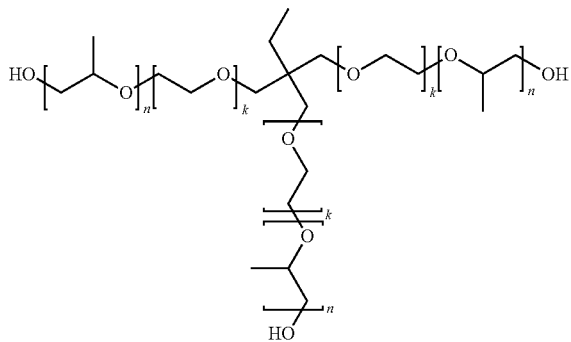

Diethylene glycol dibenzoate (Benzoflex 2088 from Eastman Chemical), shown below,

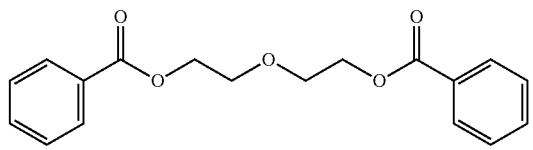 [SMILES: O=C(OCCOCCOC(=O)c1ccccc1)c1ccccc1]

and Hydrogenated polybutadiene diol 2000 molecular weight (GI2000 from Nisso Chemical), or a combination thereof.

Surfactants, specifically non-ionic surfactants, are useful in the conductive ink compositions disclosed herein because they are concentrated on the flake-polymer interface when added, they reduce the polymer interaction with the conductive flake. Preferably, surfactants that have a weak interaction with the polymer are included. Preferably, the surfactants included in the composition can be selected from a surfactant according to the following formula (commercially available as Tween 61 from Croda, Inc.)

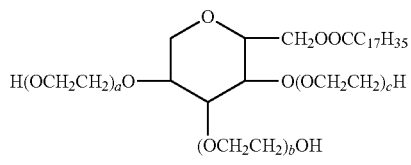

$a + b + c = 5$ a surfactant according to the following formula (commercially available as Span 60 from Croda, Inc.)

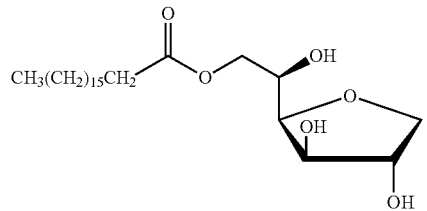

a nonionic polymeric dispersant (commercially available as Hypermer KD 14 from Croda Advanced Materials, Inc.), a solution of structured acrylate copolymer (commercially available as Disperbyk-2008 from BYK Additive & Instruments Chemistry Company), and combinations thereof.

Coupling agents are useful in the ink compositions disclosed herein because of the strong interaction with the conductive flake. Further, the short tail of coupling agents is preferred to reduce potential strong interaction with the polymer matrix.

Preferably the coupling agents are selected from the following, manufactured by Kenrich Petrochemicals, Inc. Di-isopropyl(oleyl)aceto acetyl aluminate (KA322), Titanium IV 2,2(bis 2-propenolatomethyl)butanolato, tris(dioctyl)pyrophosphato-O (LICA38), Titanium IV tetrakis(bis 2-propenolato methyl)-1-butanolato adduct 2 moles (di-tridecyl)hydrogen phosphite (KR-55), Zirconium IV tetrakis 2,2(bis-2 propenolatomethyl)butanolato, adduct with 2 moles of di-tridecyl, hydrogen phosphite (KZ-55), Zirconium IV 2,2(bis-2-propenolatomethyl)butanolato, tris(dioctyl)phosphato-O (NZ12), or a combination thereof.

Fluorinated silanes are particularly useful in the conductive ink compositions disclosed herein. When a fluorinated silane is included in the conductive ink composition one end of the silane can react with the surface of the conductive flake and the fluorinated end can reduce friction and interaction with the polymer.

Preferably, fluorinated silanes can be included in the composition according to the following formula:

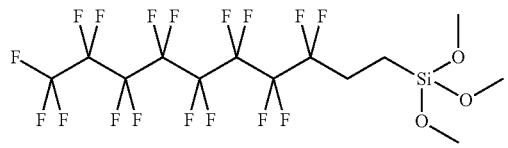 [SMILES: CO[Si](CCC(F)(F)C(F)(F)C(F)(F)C(F)(F)C(F)(F)C(F)(F)C(F)(F)C(F)(F)F)(OC)OC]

More preferably, the additive is a titanate coupling agent or a zirconate coupling agent. More preferably the additive is titanium IV tetrakis(bis 2-propenolato methyl)-1-butanolato adduct 2 moles (di-tridecyl)hydrogen phosphite (KR-55 manufactured by Kenrich Petrochemicals Inc).

The additive is included in the conductive composition in an amount from about 0.01 to about 10%, preferably from about 0.1 to about 2%, more preferably from about 0.10 to about 0.3% by volume based on the total volume of the composition.

Polymers

Useful polymers for the conductive ink compositions disclosed herein are limited by the printing method and end use of the compositions. The polymer can be selected based on the desired properties of the composition such as, for example, cure temperature, cure time, viscosity, and hardness. The polymers used herein can be, for example, thermoplastic polymers, thermosetting polymers, and elastomers.

Useful thermoplastic polymers, include but are not limited to: polyacrylate, ABS, Nylon, PLA, polybenzimidazole, polycarbonate, polyether sulfone, polyoxymethylene, polyetherether ketone, polyetherimide, polyethylene, polyphenylene oxide, polyphenylene sulfide, polypropylene, polystyrene, polyvinyl chloride, and Teflon.

Useful thermosetting polymers include but are not limited to: polyester, polyurethanes, polyurea/polyurethane, vulcanized rubber, bakelite, phenol-formaldehyde, duroplast, urea-formaldehyde, melamine, diallyl-phthalate (DAP), epoxy, epoxy novolac, benzoxazines, polyimides, bismaleimides, cyanate esters, polycyanurates, furan, silicone, thiolyte, and vinyl ester.

Useful elastomers include but are not limited to: unsaturated rubbers, such as: polyisoprene, polybutadiene, chloroprene, polychloroprene, neoprene, baypren, butyl rubber, halogenated butyl rubbers, styrene-butadiene, hydrogenated nitrile, therban, zetpol; saturated rubbers, such as: ethylene propylene (EPM), ethylene propylene diene (EPDM, epichlorohydrin (ECO), polyacrylic rubber (ACM, ABR), silicone rubber, flurorosilicone rubber, fluroroelastomers viton, tecnoflon, fluorel, aflas, Dai-El, perfluoroelastomers, tecnoflon PFR, Kalrez, Chemaz, Perlast, Polyether block amides (PEBA), chlorosulfonated polyethylene (CSM), Hypalon, ethylene-vinyl acetated (EVA); Other elastomers, such as: thermoplastic elastomers (TPE), the proteins resilin and elastin, polysulfide rubber, elastolefin, elastic fiber.

Preferably, thermal plastic urethane (TPU) is used as the polymer because TPU has high polarity, which will have a strong interaction with the conductive flake, therefore the inclusion of this polymer is useful because the combination of TPU and an additive disclosed herein will significantly reduce the polymer-flake interaction and improve stretchability.

Specifically, for example, ESTANE® 5715, ESTANE® 5703 (manufactured by Lubrizol) are useful in the compositions disclosed herein. Vinyl chloride copolymer is also useful, for example VINNOL® E15/48A (manufactured by Wacker Chemie AG).

Preferably, the additive and the polymer are selected such that they have a difference in solubility parameter greater than about 2.

Conductive Beads

The compositions disclosed herein can optionally further comprise conductive beads. The conductive beads allow the conductive flake to move relative to each other while maintaining the conductive pathway throughout the ink composition.

Further, when the randomness of the orientation of the conductive fillers is increased by the inclusion of the conductive beads, the contact efficiency of the conductive fillers is improved. Combining non-spherical conductive fillers with an aspect ratio outside of about 0.9 to about 1.1 with low aspect ratio spherical beads (aspect ratio of about 0.9 to about 1.1) can help increase this randomness of the orientation of the conductive fillers, thereby increasing the contact efficiency of the conductive fillers. The size ratio of the beads to the flake can also be optimized in order to increase the randomness of the filler orientation.

The beads are conductive and can also be made of silver, copper, gold, palladium, platinum, nickel, gold or silver-coated nickel, carbon black, carbon fiber, graphite, aluminum, indium tin oxide, silver coated copper, silver coated aluminum, metallic coated glass spheres, metallic coated filler, metallic coated polymers, silver coated fiber, silver coated spheres, antimony doped tin oxide, conductive nanospheres, nano silver, nano aluminum, nano copper, nano nickel. The beads can be made of the same material as the conductive flake or a different conductive material.

The conductive beads included in the compositions disclosed herein can have an aspect ratio from 0.9 to 1 and a diameter of less than 1 μm.

Further, the size ratio size ratio of the diameter of the beads to the size of the flake can be in the range of about 0.5 to about 2.0, for example about 0.85 to about 1.15.

Even further, the volume ratio of conductive flake to conductive bead included in the composition is in the range of about 98:2 to about 55:95, preferably about 70:30 by volume.

Solvent

The composition can further comprise additional optional components. For example, the composition can further comprise a solvent, specifically an organic solvent. The organic solvent, when included in the compositions disclosed herein can comprise an ether or ester based solvent, toluene, water, or other typical organic solvents or a combination thereof. The solvent should be stable at room temperature and soluble to the polymer included in the composition. Further, at the curing temperature of the ink composition, the solvent should evaporate quickly.

Ink Composition

The inventive stretchable conductive inks disclosed herein yield better single and multiple stretch performance, higher conductivity after stretch, and allow for a higher amount of conductive flake loading with increased flexibility and higher elongation to electrical and mechanical failure.

Specifically, the initial resistivity of the ink compositions disclosed herein is in the range of about $1 \times 10^{-3}$ to about $1 \times 10^{-5}$ Ohm*cm. Further, the resistivity at about 100% elongation is less than about 100 Ohm*cm.

Conductivity loss is defined by an open circuit Ohmmeter when no conductivity can be measured, for example when the resistance value on the Ohmmeter exceeds $10^{+6}$ Ohms. Conductivity of the ink compositions disclosed herein is not lost until elongation reaches greater than about 50%.

EXAMPLES

Test Methods

Free Standing Film

The electrically conductive ink composition was prepared in lab mixer. Next, the prepared ink is draw down onto a stencil (dumbbell shaped, ASTM D638 type V). The ink on the stencil is then placed in a convection oven at about 120° C. for about 20 minutes and then cooled to room temperature. The ink specimen is then removed from stencil. Next, the electrical resistance vs strain was measured in real time using a 4-point probe test and a bi-directional syringe pump. The tests performed include one-time stretch, stretch and hold, repeated oscillation, variable stretch rate and variable elongation tests.

Glass Slide Resistivity

The electrically conductive ink composition was prepared in lab mixer. The ink composition is then drawn down onto a glass slide with making tape for strip with target 5 mm wide, 20 μm thick. The ink composition on the glass slide was then added to a convection oven at about 120° C. for about 20 minutes. The composition was then cooled to room temperature, and the glass slide was removed. The ink composition specimen was then tested and the electrical resistance was determined with a 4 point probe.

Printed Ink on Substrate

The electrically conductive ink composition was prepared in lab mixer. The ink was then screen printed onto a substrate with target of about 3 mm to about 5 mm wide, and about 20 μm thick. The ink on the substrate was then put in a convection oven at about 80° C. to 120° C., dependent on the thermal limits of the substrate used. The ink composition on the substrate was then cooled to room temperature and tested. The electrical resistance determined with 4 pt probe.

A quantitative measure for the cohesive properties of a polymer is the cohesive energy, $E_{coh}$. The cohesive energy per unit volume is called cohesive energy density ($e_{coh}$) and the square root of the cohesive energy density the solubility or Hildebrand parameter, $\delta_h$. This parameter is frequently used in the coating industry to aid in the selection of solvents and to predict compatibility of polymers. Solubility parameters are also used to predict the chemical resistance, the permeation rate, and the mechanical properties of polymers, to name only a few applications.

The cohesive energy ($E_{coh}$) of a substance in a condensed state is defined as the increase in internal energy (U) per mole of substance if all intermolecular forces are eliminated. The correlations to the other two quantities are:

$$e_{coh} \text{ (J/cm}^3\text{=MPa)}=E_{coh}/V_m$$

$$\delta_h(\text{MPa}^{1/2})=(E_{coh}/V_m)^{1/2}=e_{coh}^{1/2}$$

In the case of low molecular weight compounds, the cohesive energy, $E_{coh}$, is the energy required to evaporate the material:

$$E_{coh} \approx \Delta H_{vap} - RT$$

whereas the cohesive energy of a polymer can only indirectly be measured because a high molecular compound usually decomposes before it evaporates. For this reason, cohesive energies are often calculated with group contribution methods.

The cohesive energy density and solubility parameters were measured for additives used in the following examples. The cohesive energy densities and solubility parameters are shown in Table 1, below. It was determined from these measured properties that the additives that increased stretchability the most have a difference of solubility parameters with the polymer included in the composition of less than about 1.

TABLE 1

| Material | Cohesive Energy Density E_coh/V (J/cm3) | Solubility Parameter Sqrt(E_coh/V) (MPa^0.5) |
|---|---|---|
| Fluorosilane | 197.49 | 14.05 |
| NZ12 | 287.48 | 16.96 |
| polybutadiene | 289.00 | 17.00 |
| Aluminate | 323.81 | 17.99 |
| KR 55 | 334.41 | 18.29 |
| Oleic acid | 346.22 | 18.61 |
| Strearic acid | 348.50 | 18.67 |
| Span 60 | 367.17 | 19.16 |
| TPU | 420.25 | 20.50 |
| Benzoflex 2088 | 497.94 | 22.31 |
| Pluracol V10 | 997.68 | 31.59 |
| Tween 61 | 1125.17 | 33.54 |

For all of the following examples, elongation tests were carried out using an Instron 5848 microtester and resistivity during stretch is tested using a four point probe test with real time measurements. The initial measurement of length was 20 mm.

Control example A is an experimental conductive ink formulation that includes a polymer and conductive particles with no additive or conductive beads. The composition of Control Example A is shown in Table 2, below wherein SF-7AT from AMES Goldsmith, Estane 5717 from Lubrizol, Butyle carbitol is from Sigma Adrich, and Dowanol PMA Glycol ether Acetate from Dow Chemical.

TABLE 2

| Component | Weight Percentage based on total composition |
|---|---|
| Dowanol PMA Glycol ether Acetate | 8.68 |
| Diethylene Glycol monobutyle ether | 26.87 |
| Estane 5715 | 8.89 |
| SF-7AT | 55.56 |
| Total | 100 |

As shown in Table 3-1, Control example A fails upon stretching because it has poor elastomeric recovery and mechanically fails early in elongation, before reaching 100%.

Several compounds were screened by mixing about 0.5 wt % into the control example A composition followed by about 30 minutes at about 120° C. to determine the effectiveness of the compounds at improving elongation. As shown in Table 2, the GI 2000 additive resulted in over a 3 times elongation as compared to the control example A composition with no additive. KR 55 additive resulted in even greater elongation as compared to the control example A composition with no additive without the increased initial resistance observed from the GI 2000 additive. PSR-1401 is Hypermer KD 14, and PSR-1401 showed similar results with over a 3 times elongation as compared to the control example A composition without any increase in initial resistance.

TABLE 3-1

Plastisizers:

| Additive | Concentration (%) | Lost Conductivity at Elongation (%) | Initial Resistance ($\Omega$) | Resistance at 50% elongation (($\Omega$)) |
|---|---|---|---|---|
| Control example | 0 | 25 | 0.05 | — |
| Pluracol V10 | 0.5 | 60 | 0.05 | 8 |
| Benzoflex 2088 | 0.5 | 100 | 0.05 | 8 |
| GI2000 | 0.5 | 160 | 0.09 | 7 |

TABLE 3-2

Coupling agents

| Additive | Concentration (%) | Lost Conductivity at Elongation (%) | Initial Resistance ($\Omega$) | Resistance at 50% elongation (($\Omega$)) |
|---|---|---|---|---|
| Control example | 0 | 25 | 0.05 | — |
| Kenrich KA322 | 0.5 | 25 | 0.12 | — |
| Kenrich LICA 38 | 0.5 | 80 | 0.15 | 28 |
| Kenrich KR55 | 0.5 | 180 | 0.04 | 3 |
| Kenrich KZ 55 | 0.5 | 70 | 0.03 | 4 |
| Kenrich NZ12 | 0.5 | 110 | 0.03 | 7.5 |

TABLE 3-3

Surfactants

| Additive | Concentration (%) | Lost Conductivity at Elongation (%) | Initial Resistance ($\Omega$) | Resistance at 50% elongation (($\Omega$)) |
|---|---|---|---|---|
| Control example | 0 | 25 | 0.05 | — |
| Tween 61 | 0.5 | 80 | 0.06 | 7 |
| PSR-1401 | 0.5 | 150 | 0.05 | 4 |
| Span 60 | 0.5 | 10 | 0.04 | — |
| Disperbyk 2008 | 0.5 | 100 | 0.05 | 4.5 |

FIG. 1 depicts a plot of resistance (Ohm) versus elongation percentage for control example A alone and with about 1 vol. % fluorosilane added. FIG. 1 shows that without the fluorosilane additive, the control example A composition fails at about 80% elongation. With fluorosilane, the control example A composition fails at about 100% elongation. FIG. 1 demonstrates that the inclusion of about 1 vol. % fluorosilane increases the stretchability of the ink composition by about 20%.

Figure 2:
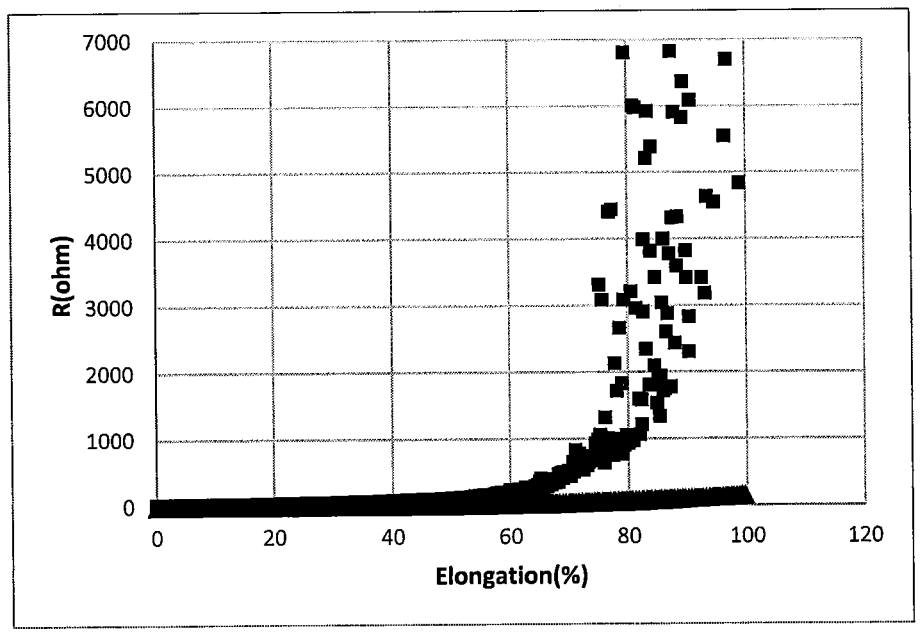
FIG. 2 depicts a plot of resistance (Ohm) versus elongation percentage for a control composition as compared to a control composition with 1 vol. % fluorosilane and 10 vol. % 200 nm silver spheres added.

FIG. 2 demonstrates that the inclusion of 200 nm silver spheres can be added to the composition to improve stretchability. Specifically, FIG. 2 depicts a plot of resistance (Ohm) versus elongation percentage of control example A composition, shown in squares, as compared to the control example A composition including about 1 vol. % fluorosilane and about 10 vol. % 200 nm silver sphere shown as triangles. FIG. 2 as compared to FIG. 1 demonstrates the improvement realized from the inclusion of the silver spheres.

Figure 3:
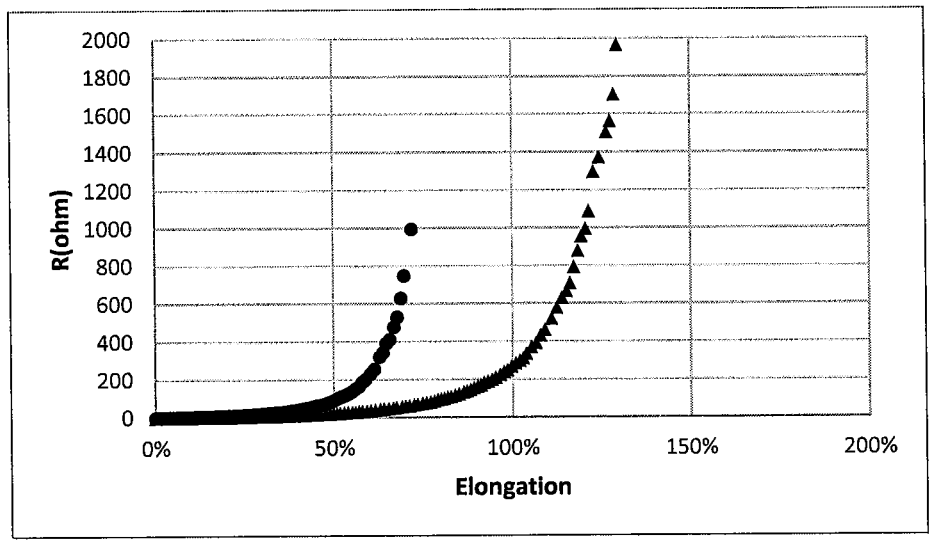
FIG. 3 depicts a plot of resistance (Ohm) versus elongation percentage of a control composition compared to a control composition with 3 vol. % of additive Kenrich KR-55 ("KR-55") included.

FIG. 3 depicts a plot of resistance (Ohm) versus elongation percentage for the control example A composition, shown in circles, compared to the control example A composition including about 3 vol. % of additive titanate coupling agent KR 55, shown in triangles. FIG. 3 as compared to FIG. 1 demonstrates the enhanced stretchability realized from the use of a titanate coupling agent such as KR 55 as an additive.

Figure 4:
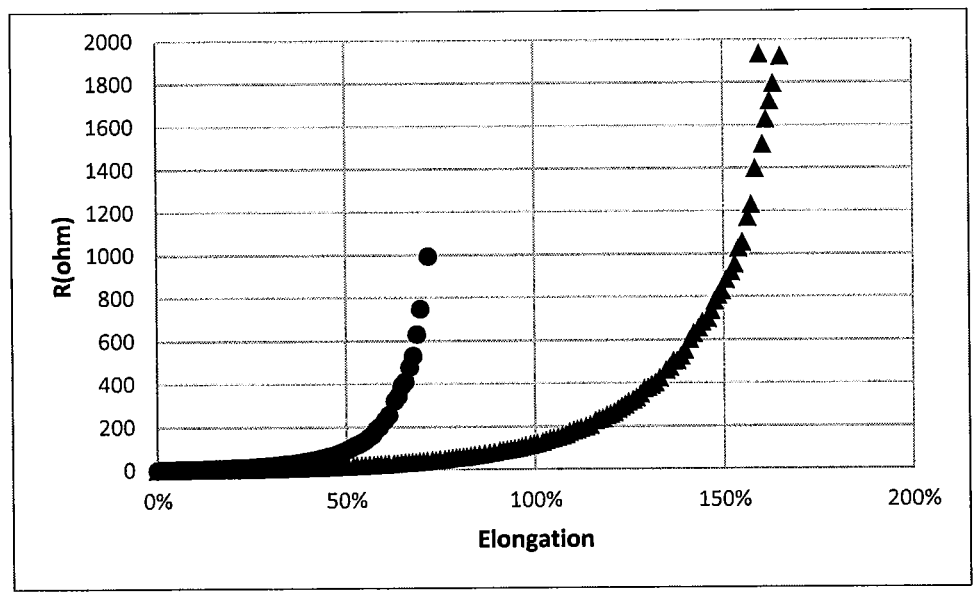
FIG. 4 depicts a plot of resistance (Ohm) versus elongation percentage for a control composition as compared to a control composition with 3 vol. % of additive KR-55 and 10 vol. % of 200 nm silver spheres added.

FIG. 4 depicts a plot of resistance (Ohm) versus elongation percentage for control composition control example A, shown in circles, as compared to control composition control example A including about 3 vol. % of KR55 and about 10 vol. % of Metalor silver powder C-0017 having a 0.70 μm particle size. FIG. 4 as compared to FIG. 3 shows the enhanced stretchability realized when silver powder is added to the composition regardless of the type of additive originally included in the composition.

The invention claimed is:

1. A stretchable conductive ink composition comprising:
   a polymer,
   conductive flake,
   conductive beads, and
   an additive,
   wherein initial resistivity is measured before elongation,
   wherein the resistivity at 50% elongation is no more than about 10 times the initial resistivity, and
   wherein the additive and the polymer have a difference in solubility parameter greater than about 2;
   wherein the ratio of conductive flake to conductive bead is in the range of about 98:2-55:95 by volume.

2. The stretchable conductive ink of claim 1, wherein the conductive flake comprises silver, aluminum, carbon, nickel, copper, graphite, or a combination thereof.

3. The stretchable conductive ink of claim 2, wherein conductive flake is silver flake.

4. The stretchable conductive ink of claim 1, wherein the resistivity at about 100% elongation is less than about 100 Ohm*cm.

5. The stretchable conductive ink of claim 4, wherein the resistivity at 100% elongation is $1\times10^{-4}$ Ohm-cm.

6. The stretchable conductive ink of claim 1, wherein the initial resistivity is in the range of about $1\times10^{-3}$ to about $1\times10^{-5}$ Ohm*cm.

7. The stretchable conductive ink of claim 1, wherein the additive is a plasticizer, coupling agent, or a surfactant.

8. The stretchable conductive ink of claim 1, wherein the conductive flake is present in the composition in an amount of about 20% to about 90% by volume.

9. The stretchable conductive ink of claim 1, wherein the additive is present in the composition in an amount from about 0.01% to about 10% by volume.

10. The stretchable conductive ink of claim 9, wherein the additive is present in the composition in an amount from about 0.10% to about 0.3% by volume.

11. The stretchable conductive ink of claim 1, wherein the polymer is a thermoplastic polyurethane.

12. The stretchable conductive ink of claim 1, wherein the additive is a titanate coupling agent or a zirconate coupling agent.

13. The stretchable conductive ink of claim 1, wherein the additive is Titanium IV tetrakis(bis 2-propenolato methyl)-1-butanolato adduct 2 moles (di-tridecyl)hydrogen phosphite.

14. The stretchable conductive ink of claim 1, wherein conductive bead is silver bead.

15. The stretchable conductive ink of claim 1, wherein the resistivity is less than $10^6$ Ohms when elongation reaches greater than about 50%.

16. The stretchable conductive ink of claim 1, wherein the conductive bead has a diameter of less than 1 μm.

17. The stretchable conductive ink of claim 1, wherein the conductive bead has an aspect ratio of about 1.

18. The stretchable conductive ink of claim 1, further comprising an organic solvent.

* * * * *